C. B. ULRICH.
TROLLING ATTACHMENT FOR FISHING LINES.
APPLICATION FILED AUG. 16, 1918.
1,313,567.
Patented Aug. 19, 1919.
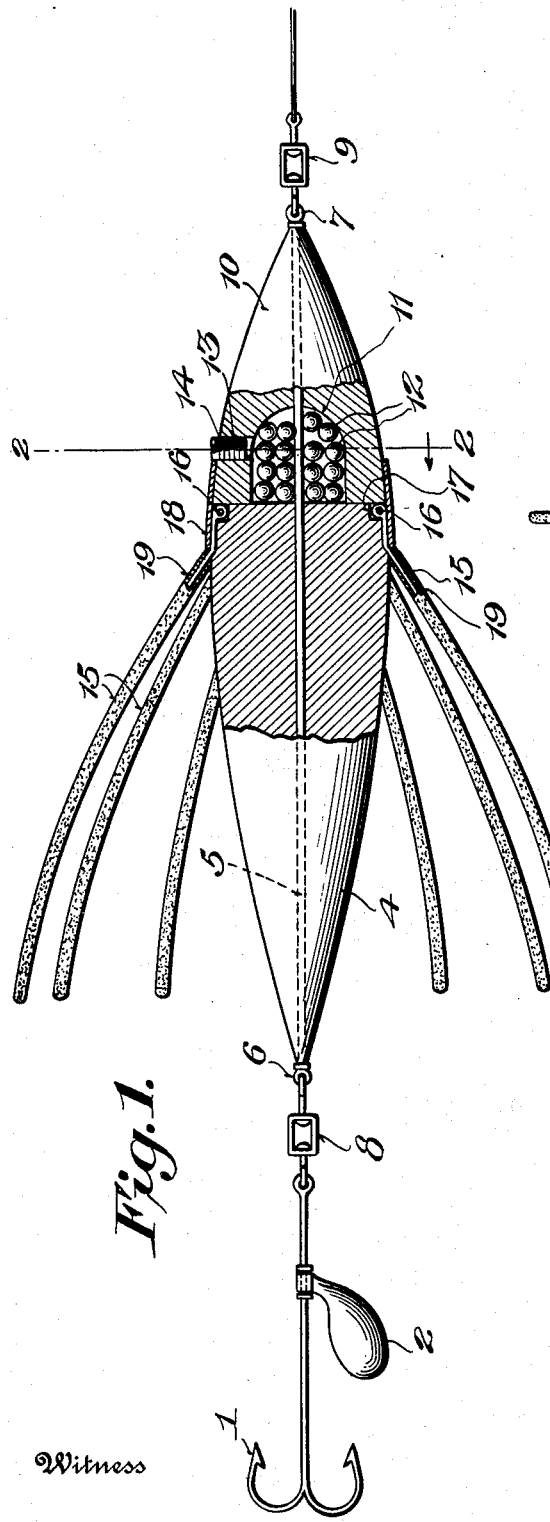
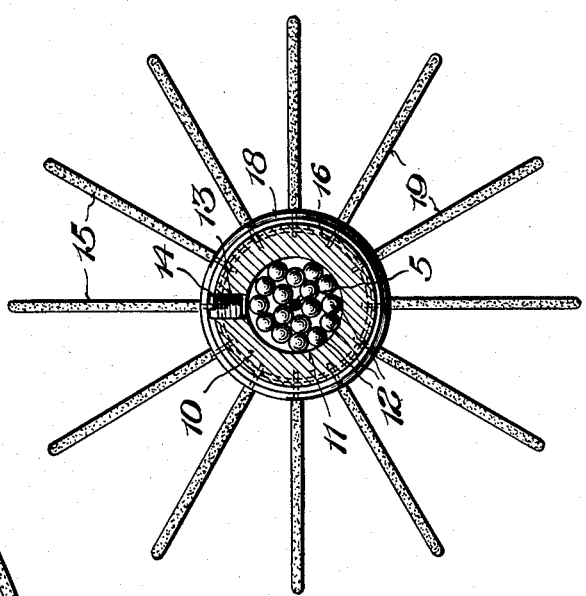

UNITED STATES PATENT OFFICE.

CHARLES B. ULRICH, OF JAMESTOWN, NEW YORK.

TROLLING ATTACHMENT FOR FISHING-LINES.

1,313,567.  Specification of Letters Patent.  Patented Aug. 19, 1919.

Application filed August 16, 1918. Serial No. 250,122.

*To all whom it may concern:*

Be it known that I, CHARLES B. ULRICH, a citizen of the United States, residing at Jamestown, in the county of Chautauqua and State of New York, have invented new and useful Improvements in Trolling Attachments for Fishing-Lines, of which the following is a specification.

This invention is a trolling attachment for fishing lines, and important objects of the invention are as follows:

To provide for regulating the depth of the fish hooks with respect to the surface of the water without changing the position of the hook or hooks on the fishing line;

To prevent twisting of the fishing line by the action of the spinner device commonly employed when trolling; and To prevent the accumulation of drift grass on the fish hooks.

With these and other objects in view, the present invention consists in the combination and arrangement of parts, as will be hereinafter more fully described, illustrated in the accompanying drawings and particularly pointed out in the appended claims, it of course being understood that changes in the form, proportion, size and minor details may be made, within the scope of the claims, without departing from the spirit or sacrificing any of the advantages of the invention.

In the drawings,

Figure 1 is a side elevation of a portion of a fishing line equipped for trolling and provided with the features of the present invention, parts being broken away to illustrate an interior construction.

Fig. 2 is a cross-sectional view on the line 2—2 of Fig. 1.

In the accompanying drawings 1 designates a fishing hook or hooks provided with any common or preferred form of spinner device 2. The fishing line proper is designated 3, and the present invention constitutes a connection between the fishing hook and the line.

The present invention includes a float body or buoyant member 4 of suitable material, preferably wood. This member is of suitable size, say five or six inches in length and about an inch at its maximum diameter, is substantially circular in cross section and tapered toward each end. Through the longitudinal axis of the body there is a metallic rod 5 provided at its opposite ends with hooks or eyes 6 and 7 disposed externally of the body. A suitable swivel 8 is interposed between the hook or eye 6 and the fish hook 1, whereby any spinning of the hook or hooks which may be occasioned by the spinner device 2 may not be imparted to the fishing line. There is also provided a suitable swivel connection 9 between the fishing line 3 and the hook or eye 7 at the forward end of the body member 4. By connecting the fishing line and the fishing hook to the opposite ends of the rod 5, instead of directly to the wooden part 4, the latter is relieved of the major portion of the strain on the line.

The major diameter of the tapered body 4 is some distance in front of the mid section of the body and the latter is separated transversely into a rear long portion and a shorter front or head portion 10, the two portions being detachably connected together in a manner as will be hereinafter described. The rear part of the head 10 is provided with a chamber 11 having an open rear end which is normally closed by the forward end of the rear part of the body 4. This chamber is designed to contain weights 12 preferably shot which may be conveniently introduced into the chamber through an opening 13 formed through the part 10 and normally closed by a removable screw plug 14.

When the present invention is in use, and the chamber 11 is empty, or substantially empty, the buoyancy of the float member 4 will maintain the fishing hook or hooks at or adjacent the surface of the water over which the fishing line is being dragged. If it is desired to maintain the fishing hook or hooks below the surface of the water, a suitable number of weights 12 are introduced into the chamber 11, thereby shifting the center of gravity of the member 4 toward the front end thereof, which will result in the downward tilting of the forward end of the member 4 which will carry said member and the fish hooks below the surface of the water and will maintain the same in this position during the trolling operation. The depth to which the device 4 and the fish hooks may be maintained may be regulated by the amount of weight placed in the chamber 11, dependent of course somewhat upon the speed with which the device is dragged through the water. Moreover the weights 12 may be employed merely for balancing the buoyant member so as to compensate for the weight of the guard arms 15.

For the purpose of preventing accumulations of drift grass on the fishing hook or hooks, there is provided a plurality of guard arms 15 which are suitably connected at their forward ends at about the major diameter of the body 4, from which the arms incline outwardly and rearwardly and terminate at or adjacent the rear end of the body, thereby forming a forwardly tapering cage surrounding the body 4 and terminating short of the fish hook. Any drift grass which strikes against the fishing line will eventually reach the guard arms 15 and will be forced outwardly out of the path of the fish hook 1, thereby maintaining unobstructed water immediately in front of the fish hook and preventing accumulations of grass on the fish hook. Each of the arms 15 is resilient so as to yield and prevent breakage or damage thereto should the arm come in contact with some non-yielding obstruction.

While each of the arms 15 may be secured to the body 4 in any suitable manner, I have illustrated in the drawings a simple and satisfactory connection, which includes a ring 16 let into an annular groove or channel 17 at the front longitudinally tapered end of the rear part of the body 4, to which ring the forward end of each arm 15 is suitably connected, as by being bent around the ring. A band or ferrule 18 of suitable width is applied to the forward end of the body 4 and is driven rearwardly so as to bind upon the body at the major diameter thereof and snugly embrace the rear end of the head 10 and the forward end of the body 4 and cover the groove or channel 17, whereby the head 10 is detachably held in place on the body, and the ring 16 is held in the groove or channel 17. Broken or damaged guard arms 15 may be readily replaced by driving off the ferrule 18, removing the ring 16, removing the damaged guard arm and applying a new guard arm.

When the buoyant body member is weighted so as to travel on the bottom of the body of water, the resilient guard arms 15 engage the bed of the body of water and prevent damage to the buoyant body and fend it off from obstructions and snags. When thus traveling on the bed of the body of water, the fish hook will be maintained a suitable distance above the bed of the body of water and in such a position as not to drag across and catch in said bed.

It is proposed to have each guard arm provided with suitable cover or envelop 19, preferably of rubber so as to avoid noise when dragging over the bed of the body of water.

By interposing the device of the present invention between the fishing line and the fishing hook, and interposing the swivel connection between the hook and the body of the present device, whatever spinning of the hook may be occasioned by the spinning device will not be transmitted to the member 4 and the fishing line 3 because of the relatively large bulk of the device 4 and the presence of the guard arms, all of which will have such a bearing on the water as to prevent spinning or turning of the member 4 and the line 3.

What I claim is:

1. The combination with a fishing line, a hook and a spinner, of a rigid buoyant member interposed between and constituting a connection between the fishing line and the hook, there being a swivel joint between the hook and the buoyant member, and guard arms carried by the buoyant member and diverging rearwardly and terminating short of the fish hook, the buoyant member having a buoyancy such as to maintain the device at or adjacent the surface of the water.

2. The combination of a fishing line, a hook, a spinner, and a rigid buoyant member, the fishing line being connected to one end of the buoyant member, a swivel connection between the hook and the other end of the buoyant member, the spinner being located between the hook and the swivel connection, and removable means carried by the buoyant member for submerging the same, said buoyant member having a buoyancy to maintain the device substantially at the surface of the water when the submerging means is removed.

3. The combination with a fishing line, a hook and a spinner, of a rigid buoyant member interposed between and constituting a connection between the fishing line and the hook, there being a swivel joint between the hook and the buoyant member, and removable means carried by the buoyant member for causing the latter to remain below the surface of the water when being dragged through the water as in trolling, said buoyant member having a buoyancy to maintain the device substantially at the surface of the water when the submerging means is removed.

4. The combination with a fishing line, a hook and a spinner, of a rigid buoyant trolling member interposed between and constituting a connection between the fishing line and the hook, there being a swivel joint between the hook and the buoyant member, and removable means whereby the center of gravity of the body may be shifted to cause the device to tilt vertically when being dragged through the water, said buoyant member having a buoyancy to maintain the device substantially at the surface of the water when the submerging means is removed.

5. The combination with a fishing line, a hook and a spinner, of a rigid buoyant member interposed between and constituting a connection between the fishing line and the hook, there being a swivel joint between the hook and the buoyant member, said body being provided with a chamber in front of its normal center of gravity and also provided with an opening to give access to the chamber, and a removable closure for said opening.

6. The combination with a fishing line, a hook and a spinner, of a rigid buoyant member interposed between and constituting a connection between the fishing line and the hook, there being a swivel joint between the hook and the buoyant member, said body being provided with a chamber in front of its normal center of gravity and also provided with an opening to give access to the chamber, a removable closure for said opening, and a plurality of weights contained within the chamber and insertible and removable through said opening.

7. The combination with a fishing line, a hook and a spinner, of a rigid buoyant trolling member having a rod extending therethrough, a swivel connection between one end of the rod and the hook, the fishing line being connected to the opposite end of the rod, said buoyant member having a buoyancy to maintain the device substantially at the surface of the water.

8. A trolling device for fishing lines comprising a rigid buoyant trolling member provided with a rod extending longitudinally therethrough and projecting at opposite ends of said buoyant member, for connection respectively, with a fishing line and a fishing hook, said buoyant member having a buoyancy to maintain the device substantially at the surface of the water.

9. A trolling attachment for fishing lines comprising a rigid buoyant member provided at opposite ends with fishing line and fishing hook connections respectively, and also provided with guard arms diverging rearwardly therefrom and terminating short of the fish hook connections, said buoyant member having a buoyancy to maintain the device substantially at the surface of the water.

10. A trolling device for fishing lines comprising a rigid buoyant member divided into front and rear parts, one of the parts being provided with a chamber having an open end which is closed by the other part of the body, the chambered part being provided with an opening to give access to the chamber, a removable closure for the opening, a plurality of weights within the chamber and insertible and removable through the opening, and means at the ends of the body for connecting thereto a fishing line and a fishing hook, respectively.

11. A trolling device for fishing lines comprising a rigid buoyant member provided at opposite ends with means for connection with a fishing line and a fishing hook respectively, the member being provided with an annular groove, a ring within the groove, and guard arms connected with the ring and diverging rearwardly therefrom.

12. A trolling device for fishing lines comprising a rigid buoyant member provided at opposite ends with means for connection with a fishing line and a fishing hook respectively, the member being provided with an annular groove, a ring within the groove, and guard arms connected with the ring and diverging rearwardly therefrom, the buoyant member being longitudinally tapered at the grooved portion thereof, and a tapered band or ferrule driven upon the tapered portion of the buoyant member, inclosing the groove and embracing the adjacent ends of the guard members.

13. A trolling device for fishing lines comprising a rigid buoyant member provided at opposite ends with means for connection with a fishing line and a fishing hook respectively, guard arms carried by an intermediate portion of the buoyant member and extending rearwardly therefrom and terminating short of the fishing hook connection, said buoyant member having a buoyancy to maintain the device substantially at the surface of the water and also being balanced to compensate for the weight of the guard arms.

CHARLES B. ULRICH.